US009028237B2

(12) United States Patent
Ito et al.

(10) Patent No.: US 9,028,237 B2
(45) Date of Patent: May 12, 2015

(54) INJECTION MOLDING MACHINE INCLUDING A MECHANISM THAT CHANGES EJECTION CHARACTERISTICS

(71) Applicant: Sumitomo Heavy Industries, Ltd., Tokyo (JP)

(72) Inventors: Yosuke Ito, Chiba (JP); Akihisa Kobayashi, Chiba (JP); Hiroshi Yamaguchi, Chiba (JP)

(73) Assignee: Sumitomo Heavy Industries, Ltd., Tokyo (JP)

( * ) Notice: Subject to any disclaimer, the term of this patent is extended or adjusted under 35 U.S.C. 154(b) by 0 days.

(21) Appl. No.: 14/135,682

(22) Filed: Dec. 20, 2013

(65) Prior Publication Data
US 2014/0178515 A1 Jun. 26, 2014

(30) Foreign Application Priority Data
Dec. 25, 2012 (JP) .................. 2012-281565

(51) Int. Cl.
*B29C 45/40* (2006.01)
*B29C 45/76* (2006.01)
*B29C 45/42* (2006.01)
*B29C 37/00* (2006.01)

(52) U.S. Cl.
CPC ......... *B29C 45/7626* (2013.01); *B29C 45/4005* (2013.01); *B29C 45/42* (2013.01); *B29C 37/0003* (2013.01); *B29C 2945/76013* (2013.01); *B29C 2945/76113* (2013.01); *B29C 2945/76244* (2013.01); *B29C 2945/76247* (2013.01); *B29C 2945/76418* (2013.01); *B29C 2945/76943* (2013.01)

(58) Field of Classification Search
CPC  B29C 45/4005; B29C 45/42; B29C 45/7626; B29C 37/0003
USPC ................... 425/556, 139; 264/334, 335, 336
See application file for complete search history.

(56) References Cited

U.S. PATENT DOCUMENTS

| 3,726,625 | A |   | 4/1973  | Rees |         |
|-----------|---|---|---------|------|---------|
| 3,840,312 | A | * | 10/1974 | Paulson et al. | 425/139 |
| 4,163,540 | A | * | 8/1979  | Cafarelli | 425/556 |

(Continued)

FOREIGN PATENT DOCUMENTS

| DE | 102010034451 | 3/2011 |
| EP | 2641718 | 9/2013 |

(Continued)

OTHER PUBLICATIONS

Extended European Search Report dated Apr. 4, 2014.

*Primary Examiner* — Tim Heitbrink
(74) *Attorney, Agent, or Firm* — IPUSA, PLLC

(57) ABSTRACT

An injection molding machine includes an ejector unit configured to eject a molding product from a mold. The ejector unit includes a support provided on a platen to which the mold is attached, a slidable base configured to slide relative to the support, a transmission mechanism supported by the support and configured to convert an input into an output corresponding to the distance between the support and the slidable base and transmit the output to the slidable base, a drive source configured to cause the transmission mechanism to operate, an ejection member configured to move together with the slidable base, and an adjustment mechanism configured to adjust the position of the slidable base relative to the ejection member.

8 Claims, 9 Drawing Sheets

(56) References Cited

U.S. PATENT DOCUMENTS

| | | |
|---|---|---|
| 6,811,391 B1 | 11/2004 | Klaus et al. |
| 8,444,409 B2 | 5/2013 | Eppich |
| 2008/0233227 A1 | 9/2008 | Onishi et al. |
| 2011/0038976 A1 | 2/2011 | Stirn et al. |
| 2013/0251837 A1 | 9/2013 | Takeuchi et al. |

FOREIGN PATENT DOCUMENTS

| | | |
|---|---|---|
| GB | 1437735 | 6/1976 |
| JP | 59-042941 | 3/1984 |
| JP | 04-168018 | 6/1992 |
| WO | WO02/40246 | 5/2002 |
| WO | WO 2005/068155 | 7/2005 |

* cited by examiner

INJECTION MOLDING MACHINE INCLUDING A MECHANISM THAT CHANGES EJECTION CHARACTERISTICS

CROSS-REFERENCE TO RELATED APPLICATIONS

This application is based upon and claims the benefit of priority of Japanese Patent Application No. 2012-281565, filed on Dec. 25, 2012. This application is also based upon Japanese Patent Application No. 2013-227059, filed on Oct. 31, 2013. The entire contents of the foregoing applications are incorporated herein by reference.

BACKGROUND

1. Technical Field

The present invention relates to injection molding machines.

2. Description of Related Art

Injection molding machines manufacture a molding product by filling the cavity space of a mold unit with molten resin and solidifying the molten resin. The mold unit includes a stationary mold and a movable mold, and the cavity space is formed between the stationary mold and the movable mode at the time of mold clamping. The molding product molded in the cavity space is ejected from the movable mold after mold opening. An ejector unit is used in this ejection.

SUMMARY

According to an aspect of the present invention, an injection molding machine includes an ejector unit configured to eject a molding product from a mold, the ejector unit including a support provided on a platen to which the mold is attached; a slidable base configured to slide relative to the support; a transmission mechanism supported by the support and configured to convert an input into an output corresponding to a distance between the support and the slidable base and transmit the output to the slidable base; a drive source configured to cause the transmission mechanism to operate; an ejection member configured to move together with the slidable base; and an adjustment mechanism configured to adjust a position of the slidable base relative to the ejection member.

It is to be understood that both the foregoing general description and the following detailed description are exemplary and explanatory and not restrictive of the invention.

DETAILED DESCRIPTION

Figure 1:
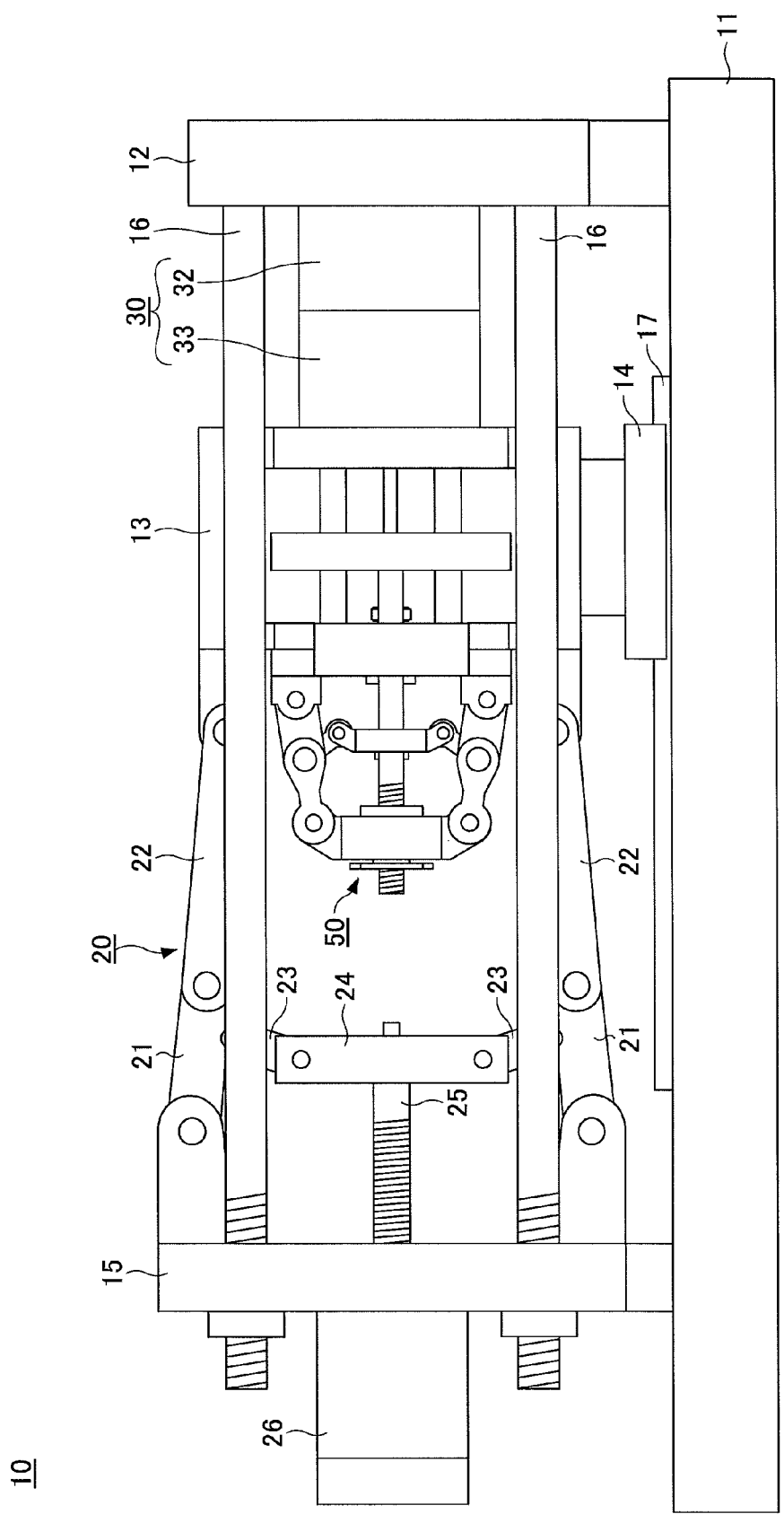
FIG. 1 is a schematic diagram illustrating an injection molding machine according to an embodiment.

It is desirable to change ejection characteristics such as an ejection force and an ejection speed when the settings of the drive source of the ejector unit are constant.

According to an aspect of the present invention, an injection molding machine capable of changing ejection characteristics is provided.

A description is given below, with reference to the accompanying drawings, of embodiments of the present invention. In the drawings, the same or corresponding configurations are referred to by the same or corresponding reference numerals, and their description is omitted. Furthermore, in the following description, a direction in which a movable platen moves at the time of mold closing is referred to as "front or forward direction" and a direction in which the movable platen moves at the time of mold opening is referred to as "rear or backward direction."

FIG. 1 is a diagram illustrating the state of an injection molding machine at the time of completion of mold closing according to an embodiment of the present invention. Referring to FIG. 1, an injection molding machine 10 includes a frame 11, a stationary platen 12 fixed to the frame 11, and a rear platen 15 provided at a distance from the stationary platen 12. The stationary platen 12 and the rear platen 15 are connected by multiple (for example, four) tie bars 16. The tie bars 16 have their axial directions in the front and the rear direction. The rear platen 15 is provided so as to be movable relative to the frame 11 in order to allow extension of the tie bars 16 at the time of mold clamping.

The injection molding machine 10 further includes a movable platen 13 provided between the stationary platen 12 and the rear plate 15. The movable platen 13 is fixed to a pair of right and left sliders 14. The sliders 14 are movable in the front and the rear direction along guides 17 provided on the frame 11. This makes it possible for the movable platen 13 to come into and out of contact with the fixed platen 12. The movable platen 13 includes grooves at positions corresponding to the tie bars 16.

The movable platen 13 according to this embodiment, which includes grooves at positions corresponding to the tie bars 16, may alternatively include through holes in place of the grooves.

A movable mold 33 is attached to a surface of the movable platen 13 that faces the stationary platen 12, and a stationary mold 32 is attached to a surface of the stationary platen 12 that faces the movable platen 13. The stationary mold 32 and the movable mold 33 form a mold unit 30. When the movable platen 13 moves forward, the movable mold 33 and the stationary mold 32 come into contact so that mold closing is performed. Furthermore, when the movable platen 13 moves backward, the movable mold 33 and the stationary mold 32 come out of contact so that mold opening is performed.

The injection molding machine 10 further includes a toggle mechanism 20 provided between the movable platen 13 and the rear platen 15 and a mold clamping motor 26 that causes the toggle mechanism 20 to operate. The mold clamping motor 26 includes a ball screw mechanism as a motion conversion part that converts rotational motion into linear motion, and causes the toggle mechanism 20 to operate by causing a drive shaft to move forward and backward.

The toggle mechanism 20 includes a crosshead 24, first toggle levers 21, second toggle levers 23, and toggle arms 22. The crosshead 24 is movable back and forth in directions parallel to a mold opening direction (to open the molding apparatus 30) and a mold closing direction (to close the molding apparatus 30). The first toggle levers 21 are pivotably attached to the rear platen 15. The second toggle levers 23 are pivotably attached to the crosshead 24. The toggle arms 22 are pivotably attached to the movable platen 13. The first toggle levers 21 and the second toggle levers 23 are pin-connected, and the first toggle levers 21 and the toggle arms 22 are pin-connected. The toggle mechanism 20 is a so-called inward folding five-joint double toggle mechanism, and is symmetric with respect to its horizontal axis.

The stationary platen 12, the movable platen 13, the rear platen 15, the toggle mechanism 20, and the mold clamping motor 26 may form a mold clamping unit.

Figure 4:
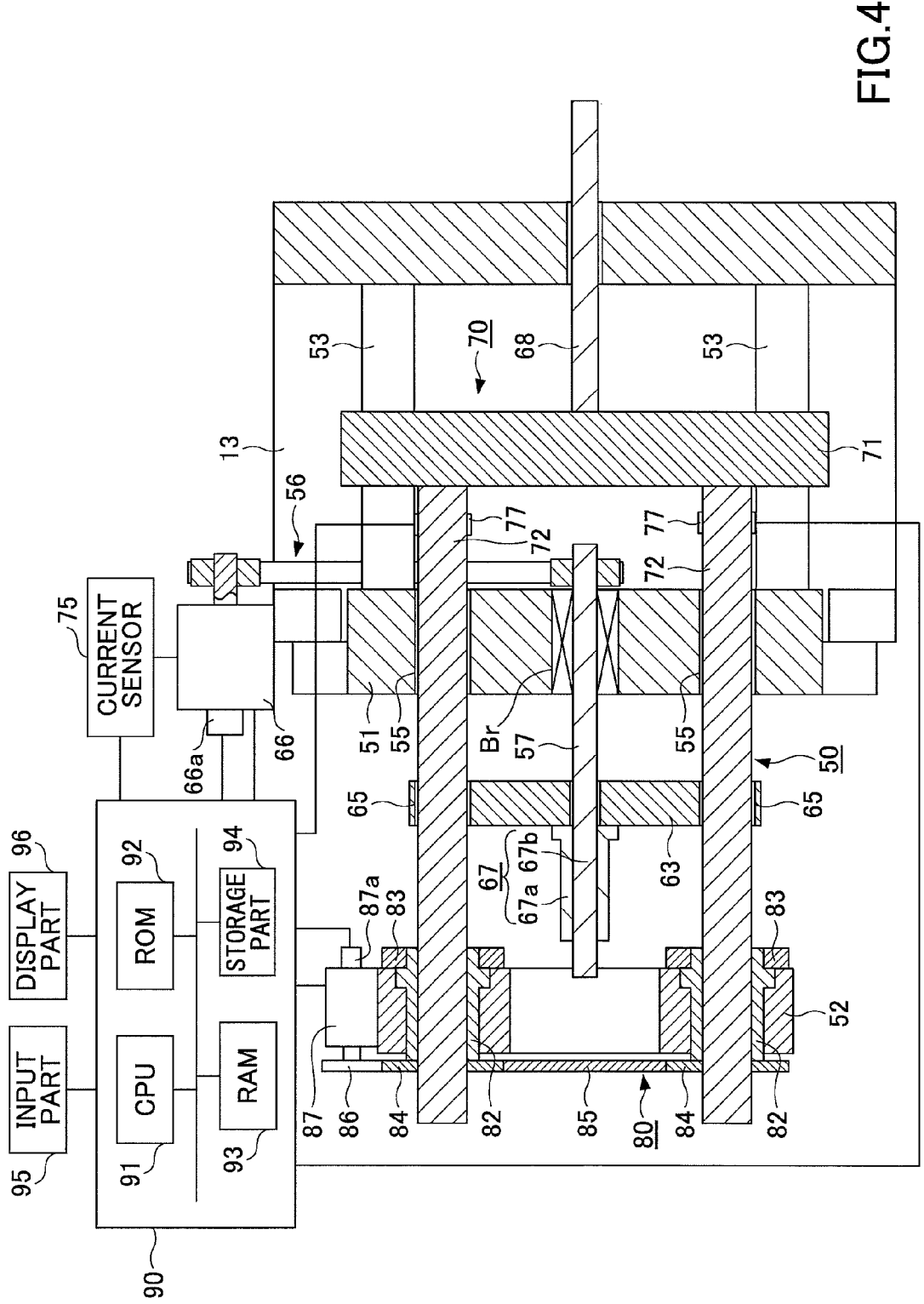
FIG. 4 is a cross-sectional view taken along a plane including line IV-IV in FIG. 2.

Next, a description is given of operations of the injection molding machine 10. The operations of a mold clamping unit, the operations of an injection unit, and the operations of an ejector unit are controlled by a controller 90 (FIG. 4). Referring to FIG. 4, the controller 90 includes a central processing unit (CPU) 91, a read-only memory (ROM) 92, a random access memory (RAM) 93, a storage part 94 such as a hard disk, an input interface, an output interface, a timer, and a counter. The controller 90 implements functions by causing the CPU 91 to execute a program stored in the ROM 92 or the storage part 94.

In a state where mold opening is completed, the toggle mechanism 20 is caused to operate by driving the mold clamping motor 26 in a forward direction to cause the crosshead 24 as a driven member to move forward. As a result, the movable platen 13 is caused to move forward, so that the movable mold 33 and the stationary mold 32 come into contact to complete mold closing as illustrated in FIG. 1.

Next, in response to further driving of the mold clamping motor 26 in the forward direction, the toggle mechanism 20 causes a mold clamping force, determined by multiplying a thrust caused by the mold clamping motor 26 by a toggle multiplying factor, to be generated. A cavity space (not graphically illustrated) is formed between the stationary mold 32 and the movable mold 33 in a clamped mold state. An injection unit fills the cavity space with molten resin, and the molten resin filling in the cavity space is solidified to become a molding product.

Next, when the mold clamping motor 26 is driven in a reverse direction to cause the crosshead 24 to move backward so that the toggle mechanism 20 is caused to operate, the movable platen 13 is caused to move backward, so that mold opening is performed. Thereafter, an ejector unit 50 ejects a molding product from the movable mold 33.

The mold clamping unit of this embodiment causes a mold clamping force to be generated using the toggle mechanism 20. Alternatively, a thrust generated by the mold clamping motor 26 may be directly transmitted to the movable platen 13 as a mold clamping force without using the toggle mechanism 20. Furthermore, a thrust generated by a mold clamping cylinder may also be directly transmitted to the movable platen 13 as a mold clamping force. Furthermore, mold opening and closing may be performed using a linear motor, and mold clamping may be performed using an electromagnet. There is no limitation on the form of the mold clamping unit.

Figure 2:
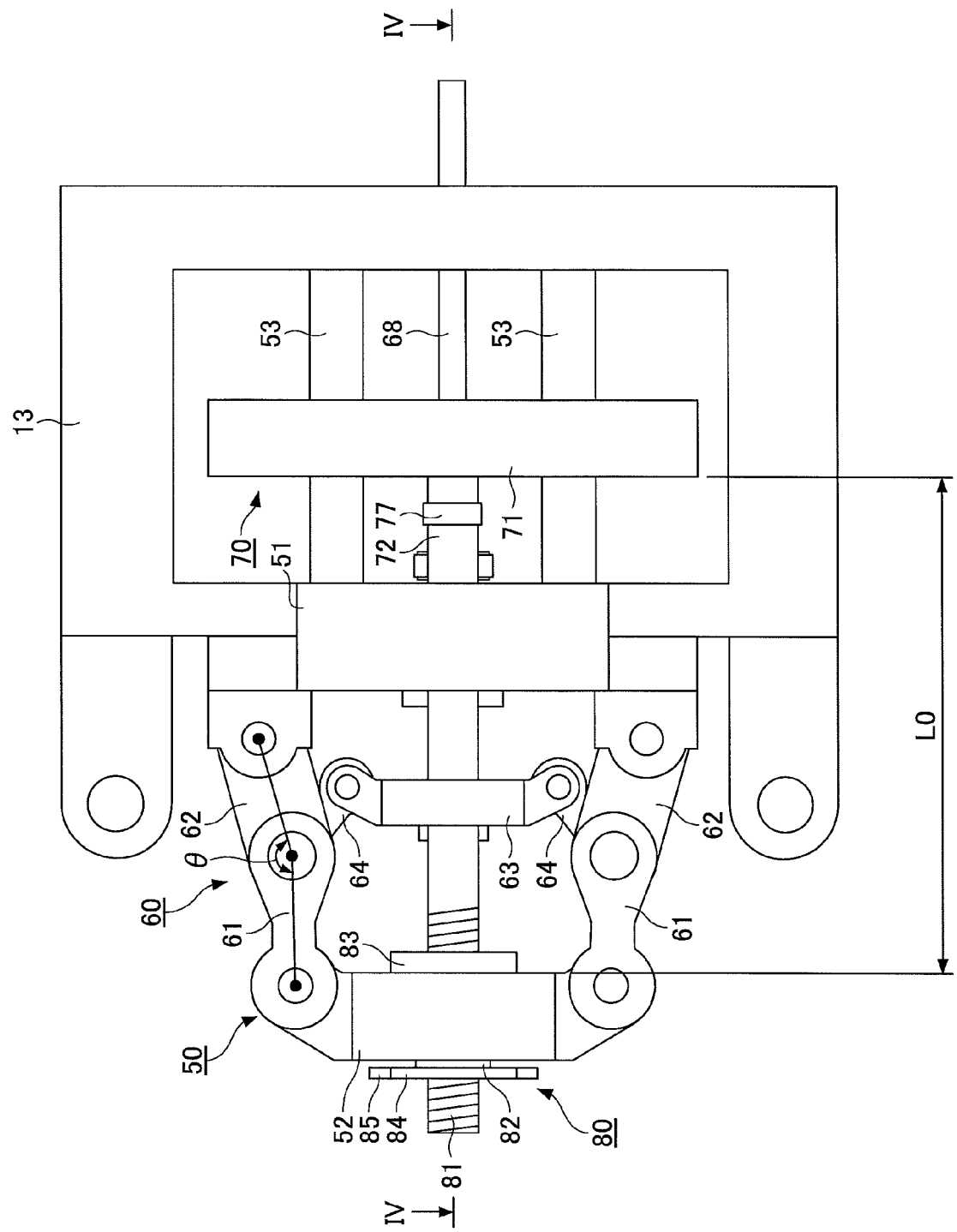
FIG. 2 is a diagram illustrating the state of an ejector unit at the start of ejection in a normal mode according to an embodiment of the present invention.
Figure 3:
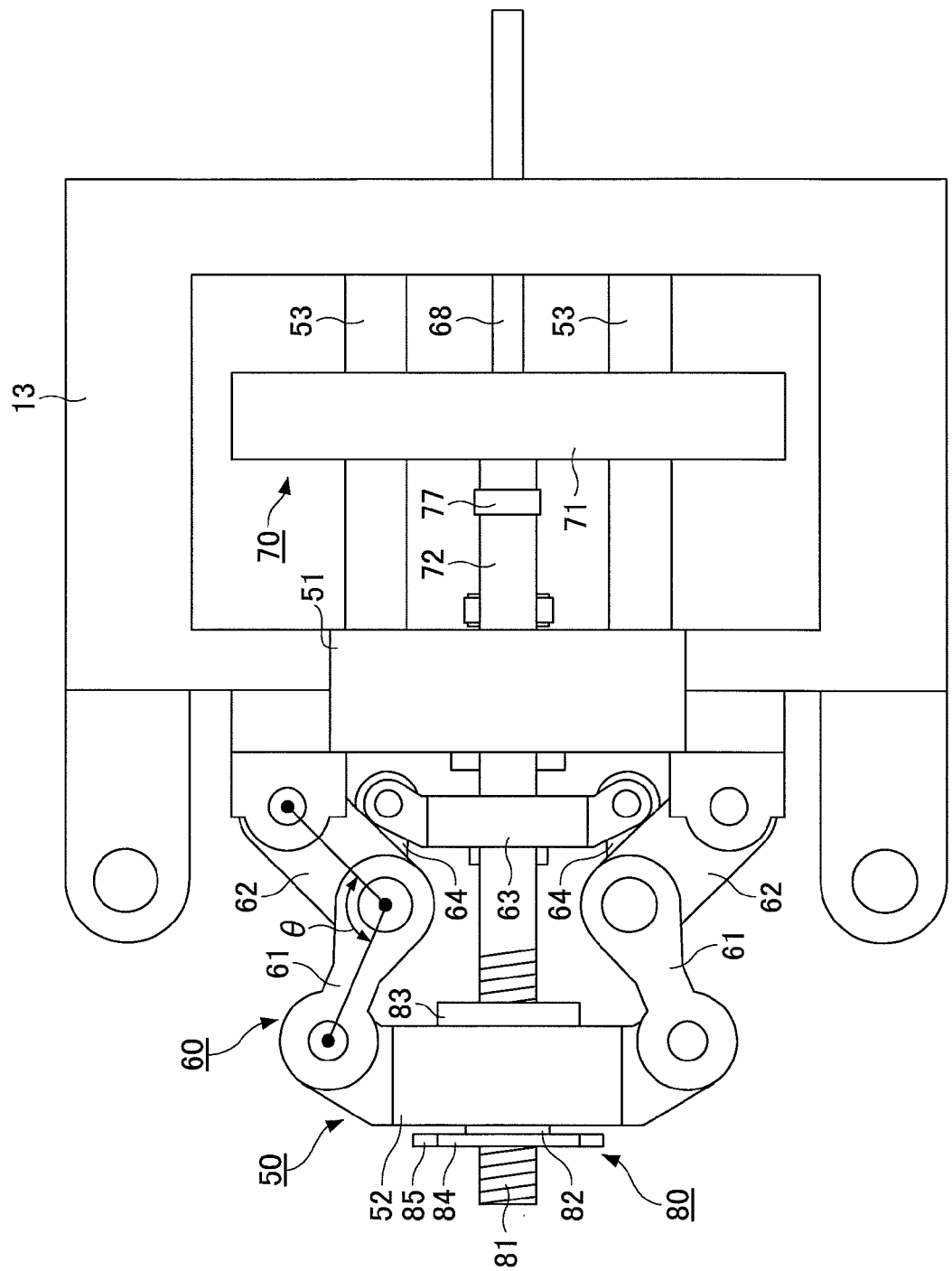
FIG. 3 is a diagram illustrating the state of an ejector unit at the completion of ejection in a normal mode according to an embodiment of the present invention.

FIG. 2 is a diagram illustrating the state of an ejector unit at the start of ejection in a normal mode according to an embodiment of the present invention. FIG. 3 is a diagram illustrating the state of an ejector unit at the completion of ejection in a normal mode according to an embodiment of the present invention. FIG. 4 is a cross-sectional view taken along a plane including line IV-IV in FIG. 2.

The ejector unit 50, which is used to eject a molding product from the movable mold 33, is provided on the movable platen 13. The ejector unit 50 includes an ejector toggle support 51 serving as a support, an ejector movable platen 52 serving as a slidable base, an ejector toggle mechanism 60 serving as a transmission mechanism, and an ejector motor 66 (FIG. 4) serving as a drive source.

The ejector toggle support 51, which supports the ejector toggle mechanism 60, is provided separately from the movable platen 13 and fixed to the movable platen 13 with bolts or the like. The ejector toggle support 51 may be provided as part of the movable platen 13. The ejector toggle support 51 includes attachment parts to which the ejector toggle mechanism 60 is attached.

The ejector movable platen 52 is movable back and forth relative to the ejector toggle support 51. The ejector movable platen 52 may be provided at a position more distant from the movable mold 33 (FIG. 1) than is the ejector toggle support 51. The ejector movable platen 52 includes attachment parts to which the ejector toggle mechanism 60 is attached.

The ejector toggle mechanism 60 converts an input (a thrust caused by the ejector motor 66, more specifically, the axial force of an ejector ball screw mechanism 67) into an output corresponding to the distance between the ejector toggle support 51 and the ejector movable platen 52 (an ejection force), and transmits the output to the ejector movable platen 52. The ejector toggle mechanism 60 is provided between the ejector toggle support 51 and the ejector movable platen 52.

As illustrated in FIG. 2 and FIG. 3, the ejector toggle mechanism 60 includes ejector toggle arms 61 and first ejector toggle levers 62. The ejector toggle arms 61 are pivotably attached to the ejector movable platen 52. The first ejector toggle levers 62 are pivotably attached to the ejector toggle support 51. The ejector toggle arms 61 and the first ejector toggle levers 62 are linked to be rotatable relative to each other about the linking positions.

The ejector toggle arms 61 and the first ejector toggle levers 62 may be interchanged. That is, the ejector toggle arms 61 may be pivotably attached to the ejector toggle support 51 and the first ejector toggle levers 62 may be pivotably attached to the ejector movable platen 52.

The ejector toggle mechanism 60 further includes an ejector crosshead 63 that is movable back and forth relative to the ejector toggle support 51, and second ejector toggle levers 64 pivotably attached to the ejector crosshead 63 and the first ejector toggle levers 62.

This ejector toggle mechanism 60 is a so-called inward folding five-joint double toggle mechanism, and is symmetric with respect to its horizontal axis. According to embodiments of the present invention, however, the ejector toggle mechanism 60 is not limited to this. For example, the ejector toggle mechanism 60 may be an outward folding toggle, a single toggle, or a four-joint toggle.

The ejector motor 66 is a drive source that causes the ejector toggle mechanism 60 to operate. The ejector motor 66 is provided on, for example, the movable platen 13. The position at which the ejector motor 66 is provided is not limited in particular, and may be, for example, the ejector toggle support 51 or the ejector movable platen 52.

The ejector motor 66 may include an encoder part 66a that detects the rpm of the output shaft of the ejector motor 66. Furthermore, a current sensor 75 that detects an electric current supplied to the ejector motor 66 may be connected to the ejector motor 66.

The rotational motion of the ejector motor 66 is converted into linear motion in the ejector ball screw mechanism 67 to be transmitted to the ejector toggle mechanism 60. The ejector ball screw mechanism 67 includes, for example, an ejector ball screw nut 67a fixed to the ejector crosshead 63, and an ejector ball screw shaft 67b mating with the thread of the ejector ball screw nut 67a. A rotating shaft 57 that coaxially extends forward from the ejector ball screw shaft 67b is attached to the ejector toggle support 51 via a bearing Br so as to be rotatable and prevented from moving back and forth relative to the ejector toggle support 51. The rotating shaft 57 is connected to the output shaft of the ejector motor 66 via a connecting member 56 including a belt and pulleys. When the output shaft of the ejector motor 66 rotates, the ejector ball screw shaft 67b rotates, so that the ejector ball screw nut 67a and the ejector crosshead 63 move toward or away from the movable mold 33.

The rotating shaft 57, which is connected to the output shaft of the ejector motor 66 via the connecting member 56 according to this embodiment, may alternatively be directly connected to the output shaft of the ejector motor 66.

When the ejector toggle mechanism 60 is caused to operate by driving the ejector motor 66 in a forward direction to cause the ejector crosshead 63 to move toward the movable mold 33, the ejector movable platen 52 is caused to move toward the movable mold 33. On the other hand, when the ejector toggle mechanism 60 is caused to operate by driving the ejector motor 66 in a reverse direction to cause the ejector crosshead 63 to move away from the movable mold 33, the ejector movable platen 52 is caused to move away from the movable mold 33.

An ejection member 70 is a member that moves together with the ejector movable platen 52. The ejection member 70 includes, for example, an ejector plate 71, ejector tie bars 72, and an ejector rod 68.

The ejector plate 71 may be provided at a position closer to the movable mold 33 than is the ejector toggle support 71. For example, the ejector plate 71 may be provided inside the movable platen 13. Guide holes for inserting guide bars 53 are formed in the ejector plate 71, so that the ejector plate 71 is movable back and forth along the guide bars 53. The guide bars 53 have respective rear end portions fixed to the ejector toggle support 51 and have respective front end portions fixed to the movable platen 13. The guide bars 53 may have their front end portions or rear end portions alone fixed to a corresponding one of the movable platen 13 and the ejector toggle support 51.

The ejector tie bars 72 are members that connect the ejector plate 71 and the ejector movable platen 52 at a distance from each other. A mold release force sensor 77 is provided around each of the ejector tie bars 72. The mold release force sensors 77 detect a mold release force by detecting the deformation of the ejector tie bars 72 caused by the release of a molding product from the movable mold 33. The mold release force, which refers to a force to cause a molding product to be released from the movable mold 33, is generated when a molding product adhering to the movable mold 33 is pushed in an ejection direction in which the molding product is ejected. No mold release force is generated even by driving the ejector motor 66 before the molding product is pushed in the ejection direction. In the case where the movable mold 33 is divided to facilitate extraction of a molding product, the mold release force includes a force to cause part of the movable mold 33 to slide relative to the rest of the movable mold 33.

Thus, according to this embodiment, because the mold release force sensors 77 detect a mold release force, it is possible to determine the state of mold release.

The tie bars 72 may be provided with their respective mold release force sensors 77, which may detect forces that are simultaneously applied to the ejector tie bars 72 when the ejector motor 66 is driven. This makes it possible to check the balance of the ejector tie bars 72. For example, it is possible to determine whether the balance is good or not based on whether or not the difference between the maximum value and the minimum value of the forces simultaneously applied to the ejector tie bars 72 is less than or equal to a predetermined value.

The mold release force sensors 77, which are composed of deformation sensors provided around the ejector tie bars 72 according to this embodiment, may alternatively be composed of, for example, load cells provided between the ejector tie bars 72 and the ejector plate 71 so as to be compressed when a molding product is released from the movable mold 33. The mold release force sensors 77 are not limited to particular kinds. Furthermore, the positions at which the mold release force sensors 77 are provided are not limited in particular as long as the mold release force sensors 77 are provided on a member driven by the ejector motor 66, which may be, for example, the ejector toggle mechanism 60, the ejector ball screw mechanism 67, the ejector movable platen 52, or the ejector rod 68.

The ejector tie bars 72 are inserted into corresponding guide holes 55 of the ejector toggle support 51 so as to be movable back and forth along the guide holes 55. As many guide holes 55 as the number of the ejector tie bars 72 (for example, two) may be provided. This makes it possible to prevent the ejector movable platen 52 from rotating about a front-rear direction as an axis.

The ejector tie bars 72 are inserted into corresponding guide holes 65 of the ejector crosshead 63, so that the ejector crosshead 63 is movable back and forth along the ejector tie bars 72. As many guide holes 65 as the number of the ejector tie bars 72 (for example, two) may be provided. This makes it possible to prevent the ejector crosshead 63 from rotating about a front-rear direction as an axis.

A rear end portion of the ejector rod 68 is fixed to the ejector plate 71. A front end portion of the ejector rod 68 may be connected to a molding product ejecting member 34 (FIG. 9 through FIG. 11) provided in the movable mold 33 (FIG. 1). When the ejector rod 68 is caused to move forward, the molding product ejecting member 34 releases a molding product from the movable mold 33. Thereafter, when the ejector rod 68 is caused to further move forward, the molding product ejecting member 34 conveys the molding product to an extraction position. When the ejector rod 68 is caused to move backward after extraction of the molding product, the molding product ejecting member 34 returns to its original position. Multiple ejector rods may be fixed to the ejector plate 71.

The ejection member 70 stays at an ejection start position (the position illustrated in FIG. 2) in a mold closing process and a mold clamping process, and moves forward from the ejection start position to an ejection completion position (the position illustrated in FIG. 3) after a mold opening process. The ejection start position of the ejection member 70 is determined by the shape of the movable mold 33, etc., and does not depend on the modes described below. After extraction of a molding product by an extractor, the ejection member 70 returns to the ejection start position.

The ejection member 70 may start its forward movement during the mold opening process in order to shorten a molding cycle.

While causing the ejection member 70 to move toward or away from the movable mold 33, the controller 90 monitors the position of the ejection member 70 relative to the movable mold 33, and supplies the ejector motor 66 with an electric current corresponding to the monitoring result. The position of the ejection member 70 relative to the movable mold 33 may be calculated from, for example, the detection result of the encoder part 66a of the ejector motor 66. Furthermore, the controller 90 monitors the torque of the ejector motor 66. The torque of the ejector motor 66 may be calculated from, for example, the detection result of the current sensor 75.

Figure 5:
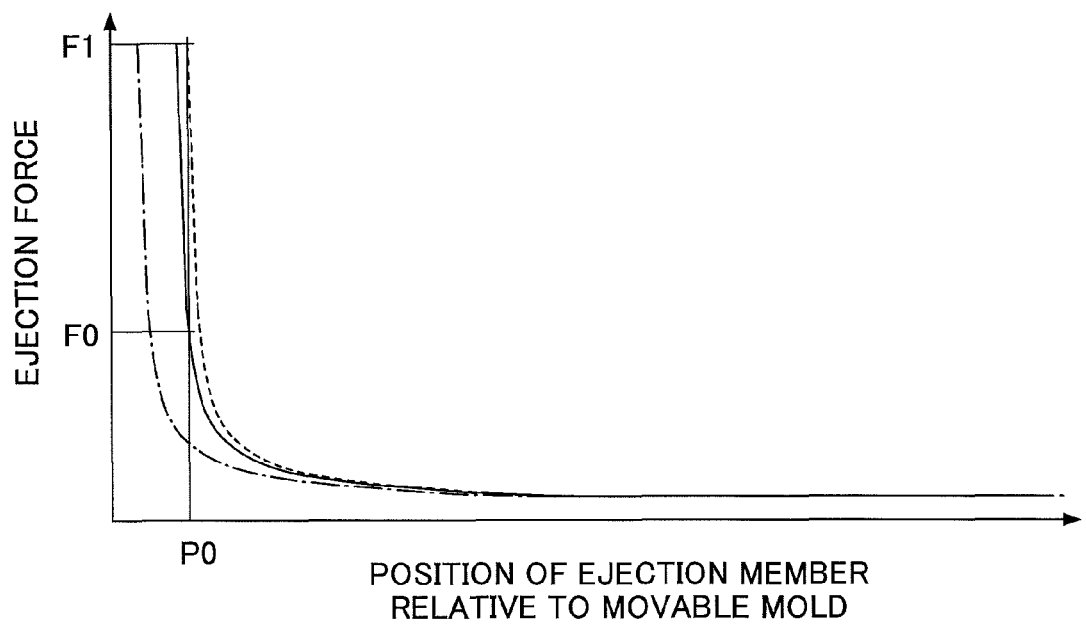
FIG. 5 is a diagram illustrating the relationship between the ejection force of an ejector unit and the position of an ejection member relative to a movable mold according to an embodiment of the present invention.
Figure 6:
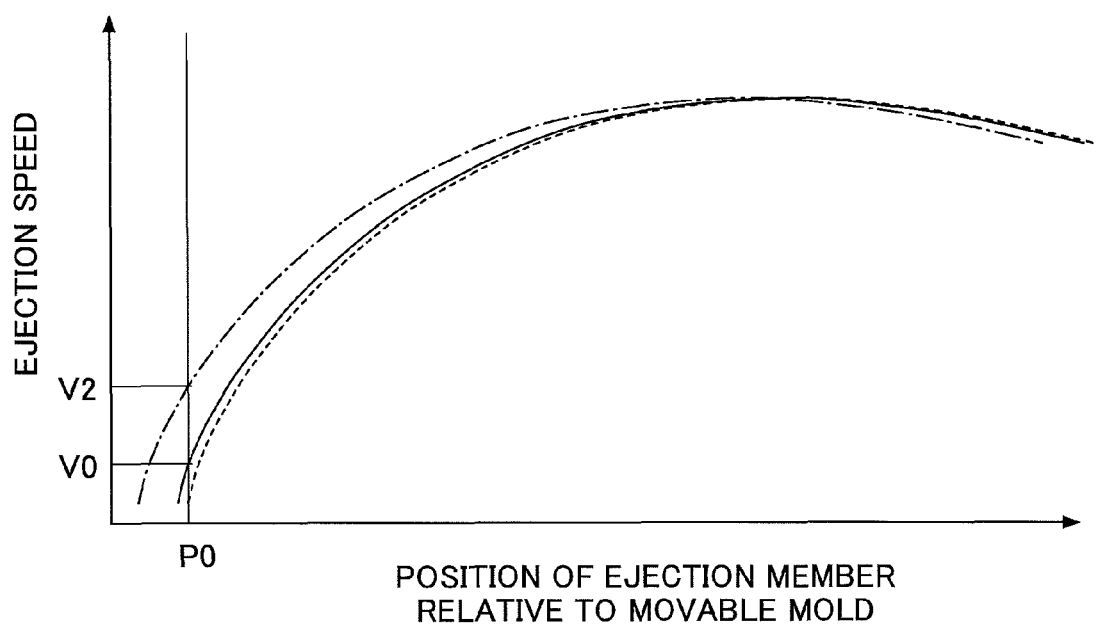
FIG. 6 is a diagram illustrating the relationship between the ejection speed of an ejector unit and the position of an ejection member relative to a movable mold according to an embodiment of the present invention.

FIG. 5 is a diagram illustrating the relationship between the ejection force of an ejector unit and the position of an ejection member relative to a movable mold according to an embodiment of the present invention. The ejection force refers to a thrust to cause the ejector movable platen 52 and the ejection member 70 to move forward. In FIG. 5, the driving force of the ejector motor 66 is constant, and the electric current supplied to the ejector motor 66 is constant. FIG. 6 is a diagram illustrating the relationship between the ejection speed of an ejector unit and the position of an ejection member relative to a movable mold according to an embodiment of the present invention. The ejection speed refers to a speed at which the ejection member 70 moves forward. In FIG. 6, the rpm of the ejector motor 66 is constant. In FIG. 5 and FIG. 6, a solid line indicates an ejection characteristic in a normal mode, a dot-chain line indicates an ejection characteristic in a high-output mode, and a broken line indicates an ejection characteristic in a high-speed mode. Before giving a description of each mode, a description is given of the relationship between the ejection characteristics of the ejector unit 50 and the position of the ejection member 70 relative to the movable mold 33.

In this embodiment, as illustrated in FIG. 2 through FIG. 4, the ejector movable platen 52 is provided at a position more distant from the movable mold 33 than is the ejector toggle support 51. Accordingly, when the ejector movable platen 52 and the ejection member 70 are caused to move forward, the distance between the ejector movable platen 52 and the ejector toggle support 51 is reduced, so that an angle θ between the centerline of each ejector toggle arm 61 and the centerline of the corresponding first ejector toggle lever 62 linked to the ejector toggle arm 61 is reduced. Accordingly, the ejection characteristics change with the forward movement of the ejection member 70 as illustrated in FIG. 5 and FIG. 6.

As illustrated in FIG. 5, in each mode, the ejection force suddenly decreases when the ejection member 70 starts to move forward from the ejection start position. Thereafter, while remaining substantially unchanged, the ejection force gradually decreases and then gradually increases with the forward movement of the ejection member 70.

Furthermore, as illustrated in FIG. 6, in each mode, when the ejection member 70 starts to move from the ejection start position, the ejection speed suddenly increases. Thereafter, with the forward movement of the ejection member 70, the ejection speed gradually increases and then gradually decreases.

Thus, the ejection characteristics of the ejector unit 50 change in accordance with the position of the ejection member 70 relative to the movable mold 33, that is, the distance between the ejector toggle support 51 and the ejector movable platen 52. According to this embodiment, at the start of ejection, the ejection force is large because of a low ejection speed, so that a molding product is easy to release. Furthermore, after the release of a molding product, the ejection speed is high, so that it is possible to quickly convey the molding product to the extraction position.

Next, a description is given of an adjustment mechanism 80 that adjusts the ejection characteristics of the ejector unit 50.

The adjustment mechanism 80 adjusts the position of the ejector movable platen 52 relative to the ejection member 70. The adjustment mechanism 80 may adjust the position of the ejector movable platen 52 relative to the movable mold 33 (that is, the angle θ between the centerline of each ejector toggle arm 61 and the centerline of the corresponding first ejector toggle lever 62) while having the position of the ejection member 70 relative to the movable mold 33 fixed to a predetermined position (for example, the ejection start position). Alternatively, the adjustment mechanism 80 may adjust the position of the ejection member 70 relative to the movable mold 33 while having the position of the ejector movable platen 52 relative to the movable mold 33 fixed to a predetermined position (that is, having the angle θ between the centerline of each ejector toggle arm 61 and the centerline of the corresponding first ejector toggle lever 62 fixed to a predetermined angle). Furthermore, the adjustment mechanism 80 may also adjust both the position of the ejection member 70 relative to the movable mold 33 and the position of the ejector movable platen 52 relative to the movable mold 33 simultaneously. The adjustment mechanism 80 may also adjust the position of the ejection member 70 relative to the ejector movable platen 52 so that the position of the ejection member 70 relative to the movable mold 33 is caused to be a predetermined position when the above-mentioned angle θ is caused to be a predetermined angle (that is, the position of the ejector crosshead 63 relative to the ejector toggle support 51 is caused to be a predetermined position) by driving the ejector motor 66.

For example, the adjustment mechanism 80 adjusts the distance between the ejector plate 71 and the ejector movable platen 52. The adjustment mechanism 80 includes, for example, a screw part 81 formed on an end portion of each of the ejector tie bars 72 and an adjusting nut 82 mated with the screw part 81. Multiple adjusting nuts 82 are provided in correspondence to the multiple ejector tie bars 72. The adjusting nuts 82 are rotatably attached to the ejector movable platen 52. As illustrated in FIG. 4, the adjusting nuts 82 are prevented from moving forward or backward relative to the ejector movable platen 52 by the ejector movable platen 52 and nut retainers 83. By rotating the adjusting nuts 82 relative to the corresponding screw parts 81, the position of the ejector movable platen 52 relative to the ejector tie bars 72 is adjusted, so that the distance between the ejector plate 71 and the ejector movable platen 52 is adjusted.

The adjusting nuts 82, which are rotatably attached on the ejector movable platen 52 side according to this embodiment, may alternatively be rotatably attached on the ejector plate 71 side to be prevented from moving forward or backward relative to the ejector plate 71.

The adjustment mechanism 80 further includes adjusting gears 84 that rotate together with the adjusting nuts 82, an intermediate gear 85 that causes the adjusting gears 84 to synchronously rotate, a driving gear 86 meshed with one of the adjusting gears 84, and an adjusting motor 87 that causes the driving gear 86 to rotate. The adjusting motor 87 may be a servomotor and includes an encoder 87a that detects the rpm of the output shaft of the adjusting motor 87. The adjusting motor 87 is subjected to feedback control based on the detection result of the encoder 87a. When the driving gear 86 is caused to rotate by driving the adjusting motor 87, the adjusting nuts 82 are caused to synchronously rotate.

According to this embodiment, the adjusting gears 84 are caused to synchronously rotate. Alternatively, the intermediate gear 85 may be removed to allow the adjusting gears 84 to independently rotate in order to achieve a balance between the ejector tie bars 72. For example, at least one of the adjusting gears 84 may be caused to rotate so that the difference between the maximum value and the minimum value of the forces simultaneously applied to the ejector tie bars 72 falls within a predetermined range.

On condition that the position of the ejector plate 71 relative to the movable mold 33 remains the same, the longer the distance between the ejector plate 71 and the ejector movable platen 52 is, the greater the angle θ between the centerline of each ejector toggle arm 61 and the centerline of the corresponding first ejector toggle lever 62 is, and accordingly, the larger the ejection force is because of a lower ejection speed.

Figure 7:
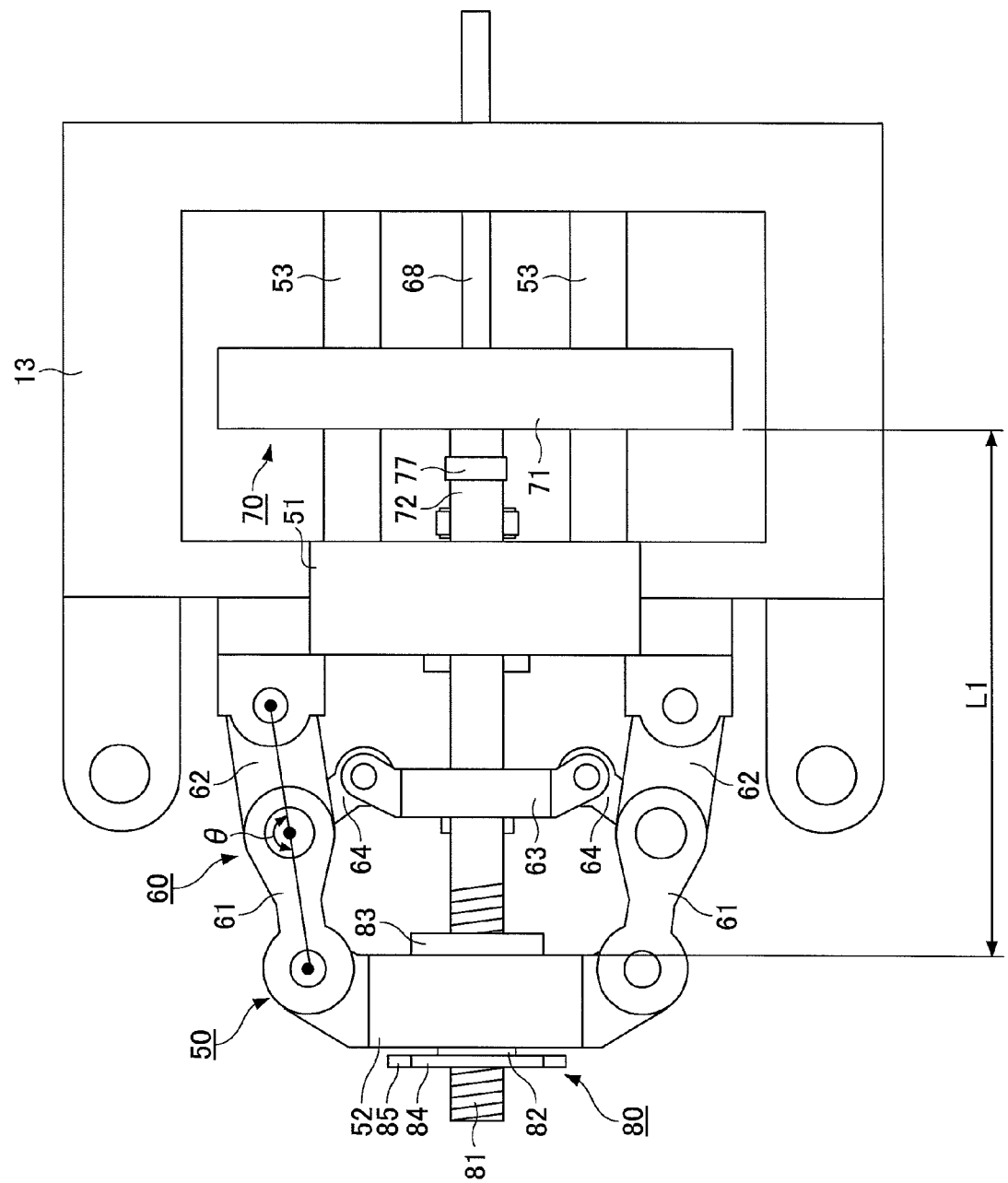
FIG. 7 is a diagram illustrating the state of an ejector unit at the start of ejection in a high-output mode according to an embodiment of the present invention.
Figure 8:
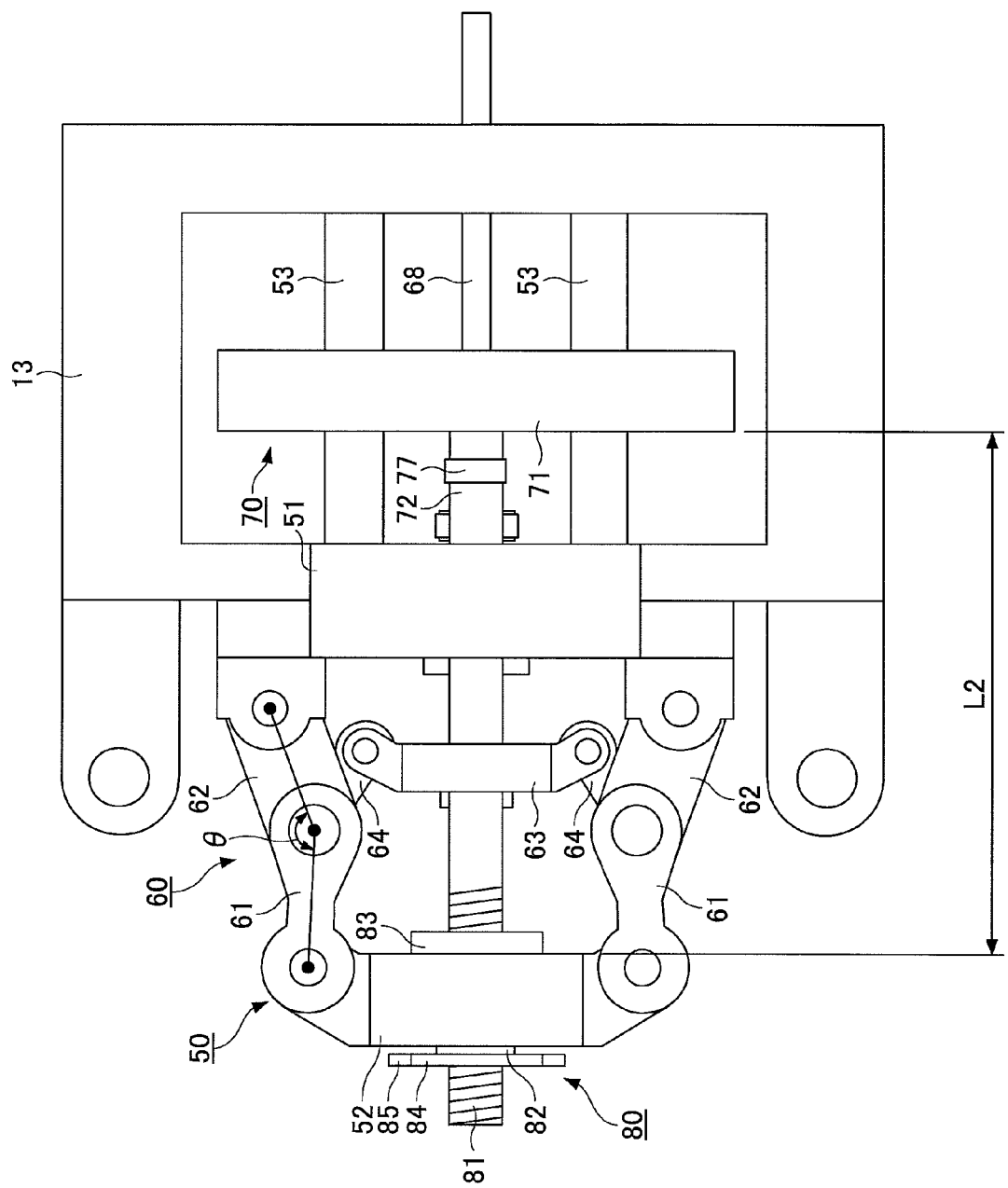
FIG. 8 is a diagram illustrating the state of an ejector unit at the start of ejection in a high-speed mode according to an embodiment of the present invention.

Accordingly, by adjusting the position of the ejector movable platen 52 relative to the ejection member 70, it is possible to adjust the ejection characteristics of the ejector unit 50 at the time when the ejection member 70 is at a predetermined position relative to the movable mold 33 (for example, the ejection start position). For example, increasing the distance between the ejector plate 71 and the ejector movable platen 52 from a distance L0 (FIG. 2) in the normal mode to a distance L1 (FIG. 7) in the high-output mode increases the ejection force at an ejection start position P0 from F0 to F1 as illustrated in FIG. 5, thus making it possible to strongly push a molding product at the start of ejection. Furthermore, decreasing the distance between the ejector plate 71 and the ejector movable platen 52 from the distance L0 in the normal mode to a distance L2 (FIG. 8) in the high-speed mode increases the ejection speed at the ejection start position P0 from V0 to V2 as illustrated in FIG. 6, thus making it possible to shorten a molding cycle.

According to this embodiment, the ejection characteristics at the time when the ejection member 70 is at the ejection start position are adjusted. Alternatively, the ejection characteristics at a time when the ejection member 70 is at a position other than the ejection start position (for example, a position close to the ejection completion position) may be adjusted.

The controller 90 has multiple optional positions for the position of the ejector movable platen 52 relative to the ejection member 70 (for example, the position illustrated in FIG. 2, the position illustrated in FIG. 7, and the position illustrated in FIG. 8) stored in the storage part 94 (FIG. 4), and selects a predetermined one of the optional positions (a predetermined optional position) when a predetermined condition is satisfied. The optional positions stored in the storage part 94 may be updated in accordance with operations input at an input part 95 (FIG. 4) that receives operations input by users.

After selecting a predetermined optional position, the controller 90 performs such control as to match the actual position with the selected optional position. Before matching the positions, the controller 90 may display a confirmation message on a display part 96 (FIG. 4). When a user who has seen the confirmation message displayed on the display part 96 performs a predetermined operation on the input part 95, the matching of the positions is performed. The position of the ejector movable platen 52 relative to the ejection member 70 may be measured based on, for example, the detection result of the encoder 87a that detects the rpm of the output shaft of the adjusting motor 87.

The input part and the display part 96, which are separately provided according to this embodiment, may alternatively be provided as a unit and be formed of a touchscreen panel.

When the input part 95 receives a user's operation to select one of the optional positions, the controller 90 may select the optional position received by the input part 95. For example, when the input part 95 receives an operation of selecting the normal mode, the controller 90 selects the position in the normal mode illustrated in FIG. 2. Furthermore, when the input part 95 receives an operation of selecting the high-output mode, the controller 90 selects the position in the high-output mode illustrated in FIG. 7. Furthermore, when the input part 95 receives an operation of selecting the high-speed mode, the controller 90 selects the position in the high-speed mode illustrated in FIG. 8.

Furthermore, the controller 90 may monitor the operating state of the ejector unit 50 at the time of injection molding and select one of the optional positions based on the monitoring result.

For example, the controller 90 may monitor whether the ejection member 70 is stationary when the ejector motor 66 is driven in the ejection direction (the forward direction). The controller 90 may select the position in the normal mode in the case of a normal state where the ejection member 70 does not become stationary, and may select the position in the high-output mode in the case of an emergency state where the ejection member 70 becomes stationary.

Whether the ejection member 70 is stationary may be determined by (a) the position of a driven member driven by the ejector motor 66 (for example, the ejection member 70 or the ejector movable platen 52). It may be determined that the driven member is stationary when there is no substantial change in the position of the driven member for a predetermined period time while the ejector motor 66 is driven. The position of the driven member may be calculated from, for example, the detection result of the encoder part 66a of the ejector motor 66.

Whether the ejection member 70 is stationary may alternatively be determined by (b) the torque of the ejector motor 66. When the torque of the ejector motor 66 becomes higher than or equal to a predetermined value for a predetermined period of time, a large force is required to cause the driven member to move forward and a molding product is firmly adhering to the movable mold 33, so that it may be determined that the ejection member 70 is stationary. The torque of the ejector motor 66 may be calculated from, for example, the detection result of the current sensor 75.

Whether the ejection member 70 is stationary may alternatively be determined by (c) the driving time of the ejector motor 66. When the ejection of a molding product is not completed when the driving time of the ejector motor 66 reaches a predetermined time, the ejection takes too much time, so that it may be determined that the ejection member 70 is stationary. The driving time of the ejector motor 66 may be measured by, for example, the timer of the controller 90.

Whether the ejection member 70 is stationary may alternatively be determined by (d) a mold release force. When the mold release force exceeds a threshold, a molding product is firmly adhering to the movable mold 33, so that it may be determined that the ejection member 70 is stationary. The mold release force may be detected by, for example, the mold release force sensors 77. Examples of the threshold include an actual value at the time when there is no abnormality in the ejector unit 50 and an estimated value predicted from the specifications of the ejector unit 50 and the specifications of the mold unit 30.

Whether the ejection member 70 is stationary may alternatively be determined based on two or more elements selected from the four elements of (a) the position of a driven member, (b) the torque of the ejector motor 66, (c) the driving time of the ejector motor 66, and (d) a mold release force. This increases the accuracy of the determination. How the elements are combined and the number of elements to be combined are not limited in particular.

In the case of the emergency state where the ejection member 70 becomes stationary, the controller 90 may drive the ejector motor 66 in the reverse direction to cause the ejection member 70 to temporarily move (backward) away from the movable mold 33. Thereafter, the controller 90 drives the adjusting motor 87 to match the position of the ejector movable platen 52 relative to the ejection member 70 with the position in the high-output mode. After matching the positions, the controller 90 may drive the ejector motor 66 in the forward direction to cause the ejection member 70 to move (forward) toward the movable mold 33.

Furthermore, in the case of the emergency state where the ejection member 70 becomes stationary, the controller 90 may alternatively match the position of the ejector movable platen 52 relative to the ejection member 70 with the position in the high-output mode without changing the position of the ejection member 70 relative to the movable mold 33. In this matching of the positions, the adjusting motor 87 is driven to increase the distance between the ejector movable platen 52 and the ejector plate 71. At this point, because the ejector plate 71 is prevented from moving forward, the ejector movable platen 52 moves backward. The ejector motor 66 is caused to rotate in the reverse direction for an amount corresponding to the backward movement of the ejector movable platen 52. After the matching of the positions, the controller 90 may drive the ejector motor 66 in the forward direction to cause the ejection member 70 to move toward the movable mold 33.

Instead of matching the position of the ejector movable platen 52 relative to the ejection member 70 with the position in the high-output mode, the controller 90 may match the position of the ejector movable platen 52 relative to the ejection member 70 with a position located further backward from the movable mold 33 than is the position in the high-output mode. As illustrated in FIG. 5, depending on the position at which the ejection member 70 is stationary, there is little difference in the ejection force between modes, so that there may not be a sufficient increase in the ejection force due to a mode change. The ejector movable platen 52 may be caused to move backward relative to the ejection member 70 to a position where the ejection force becomes a predetermined value.

The controller 90 stores the relationship between the ejection characteristics of the ejector unit 50 and the position of the ejector movable platen 52 relative to the ejection member 70 (for example, the relationship illustrated in FIG. 5 and the relationship illustrated in FIG. 6) in the storage part 94 or the like. This makes it possible to support conditions input by a user.

For example, when the input part 95 receives an operation of inputting an ejection characteristic, the controller 90 may calculate the position of the ejector movable platen 52 relative to the ejection member 70 that satisfies the ejection characteristic received by the input part, referring to the above-described stored relationships. The ejection characteristic that a user inputs on the input part 95 may be an ejection characteristic at the time when the ejection member 70 is at a specific position relative to the movable mold 33 (for example, the ejection start position or an abnormal stationary position) or an ejection characteristic throughout the movement. Furthermore, the ejection characteristic that a user inputs on the input part 95 (at least one of the ejection force and the ejection speed) may be a specific value, an upper limit value, a lower limit value, or both of the upper limit value and the lower limit value. Furthermore, the position that the controller 90 calculates may be a specific position, the most forward position, the most backward position, or both of the most forward position and the most backward position.

Furthermore, when the input part 95 receives an operation of inputting the position of the ejector movable platen 52 relative to the ejection member 70, the controller 90 may display an ejection characteristic at the position received by the input part 95 on the display part 96, referring to the above-described stored relationships.

The controller 90 may monitor a mold release force and control the adjustment mechanism 80 based on the result of the monitoring. For example, when the mold release force is smaller than a value predetermined by a test or the like, the ejection force is sufficiently large. Therefore, the controller 90 may perform such control as to reduce the distance between the ejector plate 71 and the ejector movable platen 52 so that the ejection speed (mold release speed) increases. This makes it possible to optimize the ejection characteristics and reduce a molding cycle. Furthermore, when the mold release force changes over time to be out of a predetermined range, the controller 90 may perform such control as to adjust the distance between the ejector plate 71 and the ejector movable platen 52 to vary the ejection force in accordance with the change in the mold release force. The controller 90 may monitor the mold release speed in place of the mold release force or may monitor both of the mold release speed and the mold release force. The mold release speed may be measured based on, for example, the detection result of the encoder part 66a of the ejector motor 66. Alternatively, the mold release speed may be measured with a speed sensor (not graphically illustrated) that detects the speed of the ejection member 70 or the ejector movable platen 52. When the mold release speed is lower than or equal to a predetermined value, such as when the ejection member 70 becomes stationary, the controller 90 may control the adjustment mechanism 80 so that the ejection force increases.

The display part 96 may display the detection results of the mold release force sensors 77. The display on the display part 96 is controlled by, for example, the controller 90, and is switched in accordance with an input operation on the input part 95. The detection results of the mold release force sensors 77 displayed on the display part 96 may include the transition of the mold release force and the history of the mold release force. The transition of the mold release force may be either the transition of the mold release force in the current shot or the transition of the mold release force in past shots. As the history of the mold release force, for example, the mold release force at a predetermined position (for example, the ejection start position), the maximum value of the mold release force, the average of the mold release force, the minimum value of the mold release force, and the standard deviation of the mold release force are displayed shot by shot for multiple shots.

The controller 90 adjusts the position of the ejector movable platen 52 relative to the ejector plate 71 based on (A) the position of the ejector movable platen 52 relative to the ejector toggle support 51 and (B) the position of the ejector plate 71 relative to the ejector toggle support 51.

The position of the ejector movable platen 52 relative to the ejector toggle support 51 is detected by, for example, the encoder part 66a of the ejector motor 66. Alternatively, a dedicated position sensor may be used. The reference position of the ejector movable platen 52 may be, for example, a position at the time of the full extension of the ejector toggle mechanism 60. The reference position of the ejector movable platen 52 may alternatively be a position at the time when the ejector toggle mechanism 60 is short of its full extension. The reference position of the ejector movable platen 52 may be suitably determined in accordance with the mode.

The position of the ejector movable platen 52 relative to the ejector toggle support 51 corresponds to the position of the ejector crosshead 63 relative to the ejector toggle support 51 and the angle θ between the centerline of each ejector toggle arm 61 and the centerline of the corresponding first ejector toggle lever 62 (hereinafter also referred to as "link angle θ"). Accordingly, the detection of the position of the ejector movable platen 52 relative to the ejector toggle support 51 corresponds to the detection of the position of the ejector crosshead 63 relative to the ejector toggle support 51 and the detection of the link angle θ.

The position of the ejector plate 71 relative to the ejector toggle support 51 is detected by, for example, the encoder part 66a of the ejector motor 66 and the encoder 87a of the adjusting motor 87. Alternatively, a dedicated position sensor may be used. The reference position of the ejector plate 71 may be, for example, a position at the time when the molding product ejecting member 34 provided inside the movable mold 33 comes into contact with the front end face of the movable platen 13. This position may be the ejection start position.

The position of the ejector plate 71 relative to the ejector toggle support 51 corresponds to the position of the molding product ejecting member 34 inside the movable mold 33. Accordingly, the detection of the position of the ejector plate 71 relative to the ejector toggle support 51 corresponds to the detection of the position of the molding product ejecting member 34 inside the movable mold 33.

Figure 9:
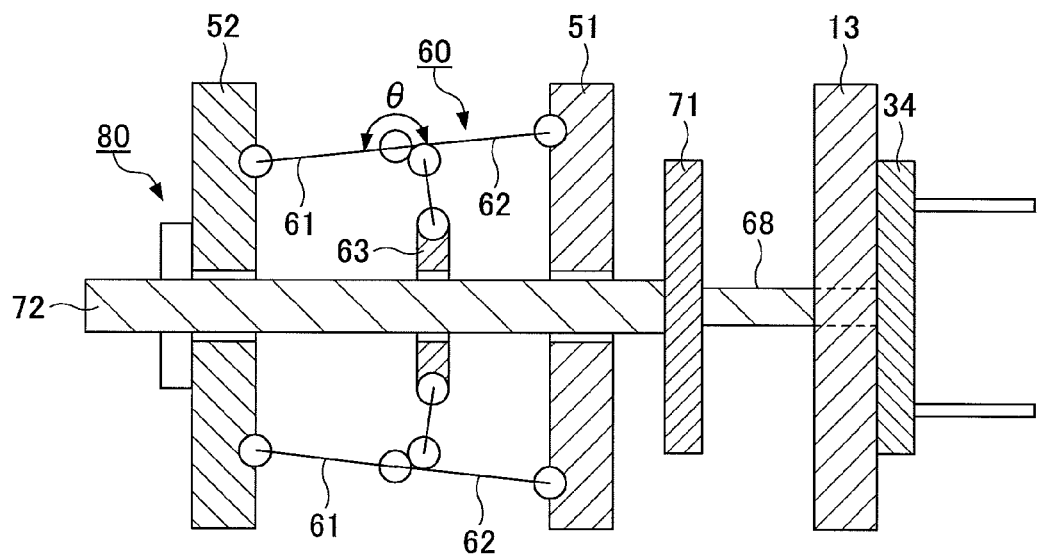
FIG. 9 is a diagram illustrating the zero state of an ejector unit according to an embodiment of the present invention.
Figure 10:
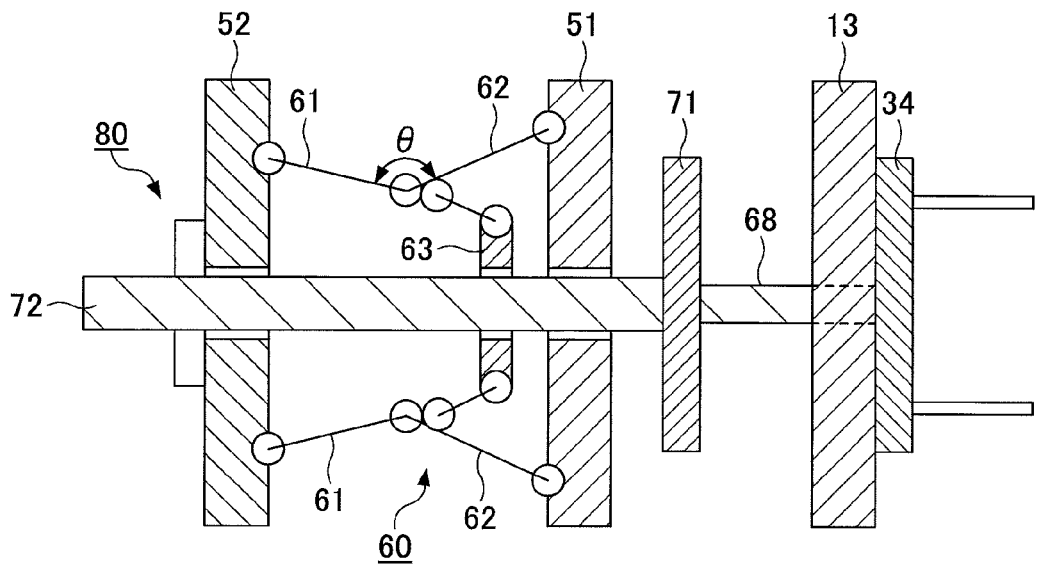
FIG. 10 is a diagram illustrating the plus state of an ejector unit according to an embodiment of the present invention.
Figure 11:
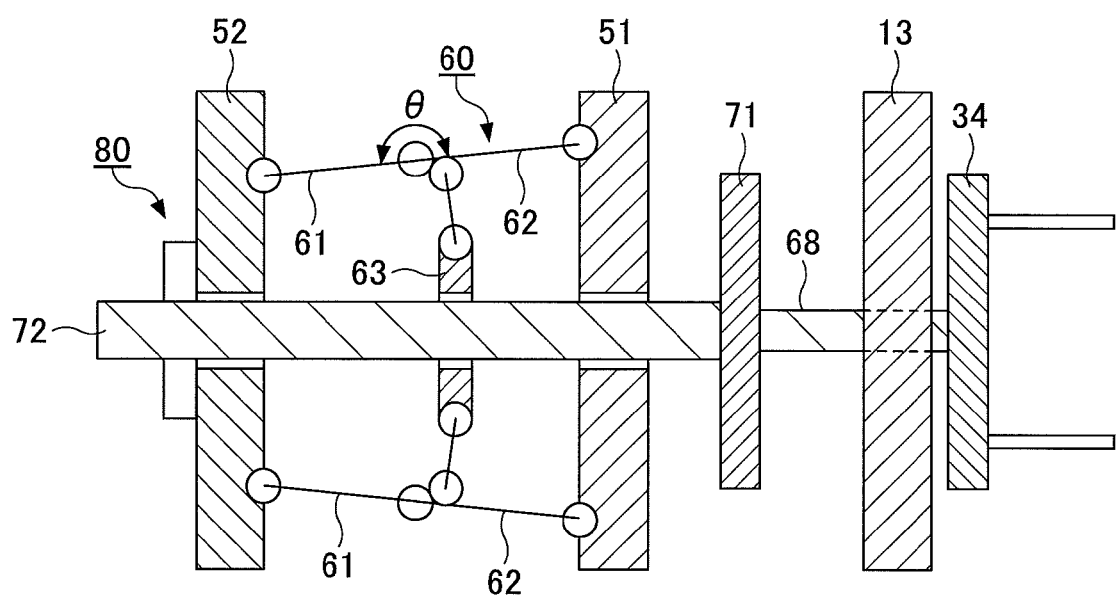
FIG. 11 is a diagram illustrating the minus state of an ejector unit according to an embodiment of the present invention.

Next, a description is given, with reference to FIG. 9, FIG. 10, and FIG. 11, of a method of adjusting the position of the ejector movable platen 52 relative to the ejector plate 71.

FIG. 9 is a diagram illustrating the zero state of an ejector unit according to an embodiment of the present invention. The "zero state" refers to a state where the ejector movable platen 52 is at the reference position and the ejector plate 71 is at the reference position.

FIG. 10 is a diagram illustrating the plus state of an ejector unit according to an embodiment of the present invention. The "plus state" refers to a state where the ejector movable platen 52 is positioned forward relative to the reference position and the ejector plate 71 is at the reference position.

FIG. 11 is a diagram illustrating the minus state of an ejector unit according to an embodiment of the present invention. The "minus state" refers to a state where the ejector movable platen 52 is positioned forward relative to the reference position and the ejector plate 71 is positioned forward relative to the reference position.

First, the controller 90 drives the ejector motor 66 to cause the ejector movable platen 52 and the ejector plate 71 to move forward. As a result, the ejector rod 68 projects forward from the movable platen 13. Thereafter, the front end portion of the ejector rod 68 and the molding product ejecting member 34 are connected. The ejector rod 68 and the molding product ejecting member 34, however, may not be connected. The ejector movable platen 52 and the ejector plate 71 are positioned forward relative to their respective reference positions.

Next, the controller 90 drives the ejector motor 66 to cause the ejector movable platen 52 and the ejector plate 71 to move backward. During this operation, the controller 90 monitors the position of the ejector movable platen 52 and the position of the ejector plate 71 and determines which of the ejector movable platen 52 and the ejector plate 71 reaches the corresponding reference position first.

In the case where the ejector plate 71 reaches the reference position first as illustrated in FIG. 10, that is, in the case where the ejector unit 50 is in the plus state, the controller 90 drives the adjusting motor 87 to cause the ejector movable platen 52 to move backward to the reference position. At this point, the ejector plate 71 is held stationary at the reference position. Thereby, the adjustment of the position of the ejector movable platen 52 relative to the ejector plate 71 is completed.

According to this embodiment, the ejector movable platen 52 is caused to move backward to the reference position with the ejector plate 71 held stationary at the reference position. Alternatively, the position of the ejector plate 71 may be shifted forward from the reference position for the distance between the current position and the reference position of the ejector movable platen 52 without moving the position of the ejector movable platen 52. It is satisfactory if the ejector movable platen 52 and the ejector plate 71 reach their respective reference positions simultaneously after the adjustment. Therefore, the positions of both the ejector movable platen 52 and the ejector plate 71 may be changed.

In the case where the ejector movable platen 52 reaches the reference position first as illustrated in FIG. 11, that is, in the case where the ejector unit 50 is in the minus state, the controller 90 drives the adjusting motor 87 to cause the ejector plate 71 to move backward to the reference position. At this point, the ejector movable platen 52 is held stationary at the reference position. Thereby, the adjustment of the position of the ejector movable platen 52 relative to the ejector plate 71 is completed.

According to this embodiment, the ejector plate 71 is caused to move backward to the reference position with the ejector movable platen 52 held stationary at the reference position. Alternatively, the position of the ejector movable platen 52 may be shifted forward from the reference position for the distance between the current position and the reference position of the ejector plate 71 without moving the position of the ejector plate 71. It is satisfactory if the ejector movable platen 52 and the ejector plate 71 reach their respective reference positions simultaneously after the adjustment. Therefore, the positions of both the ejector movable platen 52 and the ejector plate 71 may be changed.

In the case where the ejector movable platen 52 and the ejector plate 71 reach their respective reference positions simultaneously as illustrated in FIG. 9, the ejector movable platen 52 is at a desired position relative to the ejector plate 71. Therefore, the position adjustment ends as is.

When the adjustment of the position of the ejector movable platen 52 relative to the ejector plate 71 is completed, the initial adjustment is completed, so that reference ejection characteristics are obtained. Because the reference is determined, subsequent changes are easily made. Injection molding may be performed using the reference ejection characteristics or injection molding may be performed using the ejection characteristics changed after the initial adjustment. In the case of changing the ejection characteristics after the initial adjustment, the controller 90 drives the adjusting motor 87 to change the position of the ejector movable platen 52 relative to the ejector plate 71.

In the case where the ejector rod 68 and the molding product ejecting member 34 are connected, the position of the ejector movable platen 52 at the time of the full extension of the ejector toggle mechanism 60 is determined as its reference position, and the position of the ejector plate 71 at the time when the molding product ejecting member 34 comes into contact with the movable platen 13 is determined as its reference position. This makes it possible to prevent damage to the ejector unit 50 and the movable platen 13. This is because it is possible to prevent the molding product ejecting member 34 from colliding with the movable platen 13 during the extension of the ejector toggle mechanism 60.

In the case where the ejector rod 68 and the molding product ejecting member 34 are connected, the state of the ejector unit 50 may be set to the plus state as illustrated in FIG. 10 after the initial adjustment in order to obtain desired ejection characteristics. In this case, the ejector plate 71 may be prevented from moving backward from the reference position by a stopper (not graphically illustrated). This makes it possible to prevent breakage of the mold unit 30.

All examples and conditional language provided herein are intended for pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority or inferiority of the invention. Although one or more embodiments of the present invention have been described in detail, it should be understood that the various changes, substitutions, and alterations could be made hereto without departing from the spirit and scope of the invention.

For example, the injection molding machine 10 of the above-described embodiments, which is a horizontal type where a mold unit is opened and closed in horizontal directions, may alternatively be a vertical type where a mold unit is opened and closed in vertical directions. In this case, the ejector unit 50 may be provided on a stationary platen and may be used to eject a molding product from a stationary mold.

Furthermore, while the ejector unit 50 of the above-described embodiments includes the ejector toggle mechanism 60 as a transmission mechanism to transmit the force of a drive source to the ejector movable platen 52, the transmission mechanism is not limited to a particular configuration. The transmission mechanism may be any transmission mechanism as long as the transmission mechanism converts an input to an output that corresponds to the distance between a support provided on the movable platen 13 and the ejector movable platen 52 and transmits the output (converted input) to the ejector movable platen 52. For example, the transmission mechanism may also be a crank mechanism.

Furthermore, while the ejector unit 50 of the above-described embodiments includes an electric motor as a drive source to cause the ejector toggle mechanism 60 to operate, the drive source is not limited to a particular kind. For example, a hydraulic motor may be used as a drive source. Furthermore, a hydraulic cylinder such as a hydro pneumatic cylinder may also be used.

Furthermore, while the ejector movable platen 52 of the above-described embodiments is provided at a position more distant from the movable mold 33 than is the ejector toggle support 51, the ejector movable platen 52 may alternatively be provided at a position closer to the movable mold 33 than is the ejector toggle support 51. In this case, unlike the above-described embodiments, with the start of ejection, the distance between the ejector toggle support 51 and the ejector movable platen 52 increases and the angle θ between the centerline of each ejector toggle arm 61 and the centerline of the corresponding first ejector toggle lever 62 increases. Accordingly, the ejection speed is higher because of a smaller ejection force at the start of ejection than in the above-described embodiments.

Furthermore, while the ejection member 70 of the above-described embodiments is connected to the molding product ejecting member 34 provided in the movable mold 33, the ejection member 70 may alternatively not be connected to the molding product ejecting member 34. The molding product ejecting member 34 may move forward when the ejection member 70 further moves forward after moving forward to come into contact with the molding product ejecting member 34. In this case, the molding product ejecting member 34 is caused to move backward by the urging force of return springs provided in the movable mold 33.

Furthermore, of the ejection member 70 of the above-described embodiments, the ejector plate 71 and the ejector rod 68 may be used as a molding product ejecting member provided in the movable mold 33. In this case, the ejection member 70 is composed of the ejection tie bars 72 alone.

What is claimed is:

1. An injection molding machine, comprising:
   an ejector unit configured to eject a molding product from a mold,
   the ejector unit including
   a support provided on a platen to which the mold is attached;
   a slidable base configured to slide relative to the support;
   a transmission mechanism supported by the support;
   a drive source configured to cause the transmission mechanism to operate;
   an ejection member configured to move together with the slidable base; and
   an adjustment mechanism configured to adjust a position of the slidable base relative to the ejection member,
   wherein the transmission mechanism is configured to convert an input from the drive source into an output corresponding to a distance between the support and the slidable base and transmit the output to the slidable base.

2. The injection molding machine as claimed in claim 1, further comprising:
   a controller configured to monitor at least one of a force to release the molding product from the mold and a speed at which the molding product is released from the mold and control the adjustment mechanism based on a result of monitoring the at least one of the force and the speed.

3. The injection molding machine as claimed in claim 1, further comprising:
   a controller configured to control the adjustment mechanism,
   wherein the controller is configured to store a plurality of optional positions with respect to the position of the slidable base relative to the ejection member and select one of the optional positions when a predetermined condition is satisfied.

4. The injection molding machine as claimed in claim 3, wherein the controller is configured to select, when an operation of selecting one of the optional positions by a user is received by an input part, the one of the optional positions received by the input part.

5. The injection molding machine as claimed in claim 3, wherein the controller is configured to monitor an operating state of the ejector unit at a time of injection molding and select one of the stored optional positions based on a result of monitoring the operating state.

6. The injection molding machine as claimed in claim 1, further comprising:
   a controller configured to control the adjustment mechanism, wherein the controller is configured to store a relationship between an ejection characteristic of the ejector unit and the position of the slidable base relative to the ejection member.

7. The injection molding machine as claimed in claim 6, wherein the controller is configured to calculate, when an operation of inputting the ejection characteristic is received by an input part, the position of the slidable base relative to the ejection member that satisfies the ejection characteristic received by the input part by referring to the stored relationship.

8. The injection molding machine as claimed in claim 1, further comprising:
   a controller configured to control the adjustment mechanism,
   wherein the controller is configured to adjust the position of the slidable base relative to the ejection member based on a position of the slidable base relative to the support and a position of the ejection member relative to the support.

* * * * *